Patented Apr. 26, 1949

2,468,309

UNITED STATES PATENT OFFICE 2,468,309

PRESERVATION OF BUTADIENE POLYMERS WITH ACETALS OF HYDROXY ALDEHYDES

Robert L. Sibley, Nitro, W. Va., assignor to Monsanto Chemical Company, St. Louis, Mo., a corporation of Delaware No Drawing. Application January 17, 1945, Serial No. 573,317

10 Claims. (Cl. 260—32.8)

The present invention relates to a method of preserving butadiene polymers and to the products obtained thereby. The invention particularly relates to preserving rubbery polymers prepared by the polymerization of a material consisting predominantly of a conjugated butadiene hydrocarbon.

The properties of rubber and rubbery like polymers which are unique and which render them useful and in many cases essential for industrial purposes are their capability of being greatly extended under stress coupled with the property of forcibly retracting to approximately their original size and shape after the stress is removed. Many rubber articles must undergo during use a very large number of distortions and recoveries under quite wide ranges of temperature conditions. In the case of natural rubbers failure is hastened by the deteriorating effects of air or oxygen. While synthetic rubbery conjugated butadiene polymers are more resistant to oxidation than natural rubbers, they are peculiarly susceptible to deterioration through the effects of heat and especially heat in the presence of air or oxygen. The hardness of the polymer increases and it tends to become brittle with the result that it loses to a substantial degree its capability of being extended without rupture. Apparently failure is not due solely to oxidation since the change takes place in spite of the presence of the usual anti-oxidizing catalysts. While natural rubbers also exhibit this type of deterioration the effect is much less serious because the natural product originally possesses a greater capability of being extended without rupture so that although the absolute value of the loss may be as great, the aged product still retains reasonably satisfactory elastic properties. For this reason a preservative which will prevent or retard this loss of elastic properties in synthetic conjugated butadiene polymers is particularly important.

An object of the invention is to improve a synthetic conjugated butadience polymer. A particular object is to preserve a synthetic conjugated butadiene polymer and prolong its useful life. Another object is to provide a class of materials for preserving and improving the properties of a synthetic conjugated butadiene polymer. Another object is to increase the flex life of a butadiene-1,3 hydrocarbon polymer and in general to increase the useful life of vulcanized products prepared from such polymers. A still further object is to prevent or inhibit heat hardening and embrittlement of synthetic rubbery polymers of conjugated butadiene hydrocarbons. Still other objects will in part be particularly pointed out in the detailed description following and will in part be apparent.

In accordance with this invention it has been discovered that acetals and mercaptals of hydroxy aldehydes are valuable preservatives for a rubber. The preservatives of this invention possess the general formula

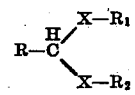

where R is an hydroxy substituted organic radicle, R₁ is an organic radicle, R₂ is an organic radicle or H and X is sulfur or oxygen. Mercaptals and acetals of the sugars are particularly efficacious preservatives and are therefore preferred. They possess the general formula

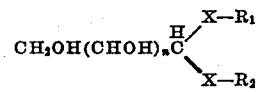

where X, R₁ and R₂ have the same significance as before and $n$ is an integer.

Typical examples of acetals and mercaptals of hydroxy aldehydes which may be employed in the practice of this invention comprise glucose diisoamyl mercaptal, glucose diethyl mercaptal, glucose ethylene mercaptal, arabinose dibutyl mercaptal, glyceraldehyde diethyl mercaptal, glucose diisoamyl acetal, glucose diethyl acetal, salicyaldehyde dimethyl acetal, salicyaldehyde dibutyl mercaptal, glycol aldehyde dimethyl acetal, glycol aldehyde dibutyl acetal, glucose S-ethyl O-methyl monothio acetal, galactose diethyl monothio acetal, glucose dibutyl monothio acetal, beta hydroxy propionaldehyde diethyl acetal, alpha hydroxy propionaldehyde diethyl acetal, beta hydroxy propionaldehyde dibutyl mercaptal, alpha hydroxy propionaldehyde dibutyl mercaptal, beta hydroxy propionaldehyde dibutyl acetal, alpha hydroxy propionaldehyde dibutyl acetal, aldol diethyl acetal, aldol diethyl mercaptal, aldol dibutyl acetal, aldol dibutyl mercaptal, glucose mono butyl acetal, glucose mono methyl acetal. The mono acetals are also known as glucosides.

Methods of making mercaptals and acetals are well known and are described in the literature. However, methods for preparing the preservatives of this invention are illustrated below although it is to be understood that the invention is not limited thereto.

EXAMPLE I

Substantially 100 parts by weight of dextrose (0.55 molecular proportions) were carefully mixed with 100 parts by weight of concentrated hydrochloric acid, sp. g. 1.19. The mixture was cooled to about 10° C. and substantially 100 parts by weight (1.11 molecular proportions) of n-butyl mercaptan were gradually added to the cold mixture. An exothermic reaction set in immediately and the desired mercaptal precipitated from solution. After stirring for a short time the white crystalline product was filtered off, washed and dried. The crude glucose dibutyl mercaptal melted at 127° and after recrystallizing from alcohol the M. P. was 133° C.

EXAMPLE II

Substantially 50 parts by weight of anhydrous dextrose (0.27 molecular proportions) were mixed with substantially 40 parts by weight of mercapto ethanol (0.51 molecular proportions). The mixture was cooled to 20° C. and 60 parts by weight of concentrated hydrochloric acid sp. g. 1.19 was added with cooling. The charge was stirred at 2–6° C. for several hours and the clear solution allowed to warm up to room temperature. After diluting with 79 parts by weight of ethyl alcohol, the acid present was neutralized with basic lead carbonate and the salt cake filtered off, washed with alcohol and the filtrate and washings combined. The alcohol and water were then distilled off under reduced pressure. The residue was a thick viscous liquid believed to be glucose di hydroxy ethyl mercaptal. It was obtained in excellent yield and exhibited highly desirable preservative action as hereinafter described.

EXAMPLE III

Substantially 100 parts by weight of dextrose (0.55 molecular proportions) were carefully mixed with cooling with substantially 74 parts by weight of n-butanol (1.0 molecular proportion) and 119 parts by weight of concentrated hydrochloric acid, sp. g. 1.19. The mixture was stirred at 5–10° C. for approximately seven hours and then diluted with 160 parts by weight of alcohol and the acid neutralized, as for example with basic lead carbonate. The insoluble lead salts were filtered off and the salt cake washed with alcohol. From the combined filtrate and washings the solvent was removed, preferably by distillation under vacuum. The residue was a very thick clear viscous syrup believed to be a mixture of glucose butyl acetals. When incorporated into butadiene polymers it imparted the desirable properties hereinafter described.

As specific embodiments of the invention which illustrate the invention but are not limitative thereof stocks were compounded comprising

| | Base stock Parts by weight |
|---|---|
| Copolymer of butadiene-1,3 and styrene* | 100 |
| Carbon black | 40 |
| Zinc oxide | 3 |
| Saturated hydrocarbon softener | 8 |
| Sulfur | 1.75 |
| N-cyclohexyl 2-benzothiazole sulfenamide | 1.2 |

* GR=S Rubber.

From the base stock compositions were prepared as follows:

| Stock | Preservative | Amount, Parts by Weight |
|---|---|---|
| A | Glucose dibutyl mercaptal | 3 |
| B | Glucose diisopropyl mercaptal | 3 |
| C | Glucose di n-propyl mercaptal | 3 |
| D | Glucose diethyl mercaptal | 3 |
| E | Glucose butyl acetal mixture | 3 |
| F | Glucose dihydroxy ethyl mercaptal | 3 |
| G | Glucose di tolyl mercaptal | 3 |
| H | Glycol aldehyde diethyl acetal | 3 |

The stocks so compounded were cured by heating in the usual manner in a press at 142° C. and the vulcanized products were then artificially aged by heating in circulating air for 24 hours in an oven at 100° C. The modulus and tensile properties of the vulcanized products before and after aging are set forth below.

Table I

| Stock | Modulus of Elasticity at Elongation of 300% | Tensile at Break in lbs./in.$^2$ | Ult. Elong., percent | Modulus of Elasticity at Elongation of 300% | Tensile at Break in lbs./in.$^2$ | Ult. Elong., percent |
|---|---|---|---|---|---|---|
| | Unaged—60 min. cure | | | Aged—60 min. cure | | |
| Base | 1,000 | 3,140 | 620 | 1,555 | 2,080 | 365 |
| A | 770 | 2,855 | 680 | 845 | 2,820 | 625 |
| B | 785 | 2,650 | 635 | 945 | 3,310 | 600 |
| C | 795 | 3,075 | 680 | 1,040 | 2,570 | 430 |
| D | 750 | 3,050 | 700 | 910 | 3,040 | 630 |
| E | 670 | 2,625 | 740 | 930 | 2,705 | 555 |
| F | 965 | 3,120 | 620 | 1,170 | 2,880 | 520 |
| G | 765 | 2,535 | 605 | 870 | 3,000 | 630 |
| H | 605 | 2,910 | 750 | 1,050 | 3,050 | 600 |
| | Unaged—90 min. cure | | | Aged—90 min. cure | | |
| Base | 1,030 | 3,050 | 590 | 1,395 | 2,605 | 450 |
| A | 765 | 2,940 | 700 | 755 | 2,820 | 650 |
| B | 900 | 3,120 | 710 | 760 | 2,810 | 650 |
| C | 790 | 3,110 | 690 | 910 | 3,135 | 635 |
| D | 695 | 2,920 | 680 | 790 | 3,010 | 645 |
| E | 625 | 2,780 | 660 | 825 | 3,020 | 670 |
| F | 925 | 3,130 | 600 | 1,130 | 2,960 | 550 |
| G | 780 | 3,120 | 690 | 835 | 2,950 | 640 |
| H | 555 | 2,700 | 680 | 940 | 2,820 | 595 |

Again, practice of this invention is not limited to the specific compositions given above, such compositions being merely illustrative of the manner of employing the preservatives of this invention. They may be employed in conjunction with other vulcanizing agents than those mentioned for this invention is applicable to compositions of polymers of conjugated butadiene hydrocarbons of most varied nature. Other accelerators and activators may be employed with varying differences in tensile and modulus properties but still exhibiting the desirable properties of the class. While about three percent by weight based on the copolymer of the new preservatives is about the optimum amount, smaller amounts as for example one percent, may be used and desirable preservation thereby effected. Amounts in excess of about three percent can be used but generally without increased benefit. The usual method of treating the polymer is to incorporate the preservative into the polymer by milling or similar procedure but other means may be employed. For example, the preservative may be added to a dispersion of the polymer.

The present invention is limited solely by the claims attached hereto as part of the present specification.

What is claimed is:

1. The method of preserving a rubbery polymer prepared by the polymerization of butadiene-1,3 and styrene which comprises incorporating therein 1-3 percent based on the polymer of an acetal of a hydroxy aldehyde.

2. The method of preserving a rubbery polymer prepared by the polymerization of butadiene-1,3 and styrene which comprises incorporating therein 1-3 percent based on the polymer of a sugar acetal.

3. The method of preserving a rubbery polymer prepared by the polymerization of butadiene-1,3 and styrene which comprises incorporating therein 1-3 percent based on the polymer of a compound of the structure

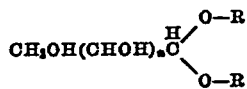

where $n$ is an integer and the R's are aliphatic chain radicles.

4. The method of preserving a rubbery polymer prepared by the polymerization of butadiene-1,3 and styrene which comprises incorporating therein 1-3 percent based on the polymer of an acetal of an hydroxy aliphatic aldehyde.

5. The method of preserving a rubbery polymer prepared by the polymerization of butadiene-1,3 and styrene which comprises incorporating therein 1-3 percent based on the polymer of a compound of the structure

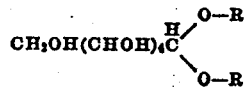

where the R's are aliphatic chain radicles.

6. The vulcanized rubbery polymer of the copolymerization product of butadiene-1,3 and styrene preserved by having incorporated therein 1-3 percent based on the polymer of an acetal and mercaptals of a hydroxy aldehyde.

7. The vulcanized rubbery polymer of the copolymerization product of butadiene-1,3 and styrene hydrocarbon preserved by having incorporated therein 1-3 percent based on the polymer of a sugar acetal.

8. The vulcanized rubbery polymer of the copolymerization product of butadiene-1,3 and styrene hydrocarbon preserved by having incorporated therein 1-3 percent based on the polymer of a compound of the structure

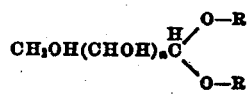

where $n$ is an integer and the R's are aliphatic chain radicles.

9. The vulcanized rubbery polymer of the copolymerization product of butadiene-1,3 and styrene preserved by having incorporated therein 1-3 percent based on the polymer of an acetal of an hydroxy aliphatic aldehyde.

10. The vulcanized rubbery polymer of the copolymerization product of butadiene-1,3 and styrene preserved by having incorporated therein 1-3 percent based on the polymer of a compound of the structure

where the R's are aliphatic chain radicles.

ROBERT L. SIBLEY.

REFERENCES CITED

The following references are of record in the file of this patent:

UNITED STATES PATENTS

| Number | Name | Date |
|---|---|---|
| 2,380,475 | Stewart | July 31, 1945 |
| 2,380,905 | Stewart | July 31, 1945 |

FOREIGN PATENTS

| Number | Country | Date |
|---|---|---|
| 498,302 | Great Britain | Jan. 2, 1939 |

Certificate of Correction

Patent No. 2,468,309. April 26, 1949.

ROBERT L. SIBLEY

It is hereby certified that errors appear in the printed specification of the above numbered patent requiring correction as follows:

Column 4, Table 1, second column thereof, eighth line from bottom, for the numeral "765" read *675*; column 6, line 12, claim 6, strike out the words "and mercaptals"; and that the said Letters Patent should be read with these corrections therein that the same may conform to the record of the case in the Patent Office.

Signed and sealed this 4th day of October, A. D. 1949.

[SEAL]

THOMAS F. MURPHY,
*Assistant Commissioner of Patents.*